United States Patent [19]

Rauter

[11] Patent Number: 5,125,428
[45] Date of Patent: Jun. 30, 1992

[54] DEVICE FOR EQUALIZING PRESSURE BETWEEN MACHINE HOUSING AND THE SURROUNDINGS

[75] Inventor: Jürgen Rauter, Friedrichshafen, Fed. Rep. of Germany

[73] Assignee: Zahnradfabrik Friedrichshafen AG, Fed. Rep. of Germany

[21] Appl. No.: 635,108
[22] PCT Filed: Jul. 15, 1989
[86] PCT No.: PCT/EP89/00830
§ 371 Date: Jan. 11, 1991
§ 102(e) Date: Jan. 11, 1991
[87] PCT Pub. No.: WO90/01130
PCT Pub. Date: Feb. 8, 1990

[30] Foreign Application Priority Data

Jul. 21, 1988 [DE] Fed. Rep. of Germany ....... 3824810

[51] Int. Cl.⁵ ............................................. B01D 19/00
[52] U.S. Cl. ..................................... 137/199; 210/188
[58] Field of Search ................ 137/197, 199; 210/436, 210/472, 477, 188

[56] References Cited

U.S. PATENT DOCUMENTS 3,326,230 6/1967 Frank .................................. 137/199
4,319,996 3/1982 Vincent .

FOREIGN PATENT DOCUMENTS 0155115 9/1985 European Pat. Off. .
2053760 5/1972 Fed. Rep. of Germany .
2414849 8/1979 France .
2140706 12/1984 United Kingdom .
2157586 10/1985 United Kingdom .

Primary Examiner—Alan Cohan
Attorney, Agent, or Firm—Davis, Bujold & Streck

[57] ABSTRACT

The pressure compensator (2) is provided with gas-pervious but water and lubricating oil retaining diaphragms (10) which are supported on supporting grids (13) of less elastic material and elastomer rings (12). The diaphragms (10) permit the utilization of their flexibility for periodic ejection of dirt coatings automatic with the aid of pressure oscillations resulting during operation which lead to alternating bulgings and dropping of dirt. The installation of the diaphragms (10), while keeping an interspace (14) that remains at least on one side free, is provided in an insert body (3) which, depending on what may be needed, can be designed as a nipple, an annular cassette or directly as a seal element.

14 Claims, 2 Drawing Sheets

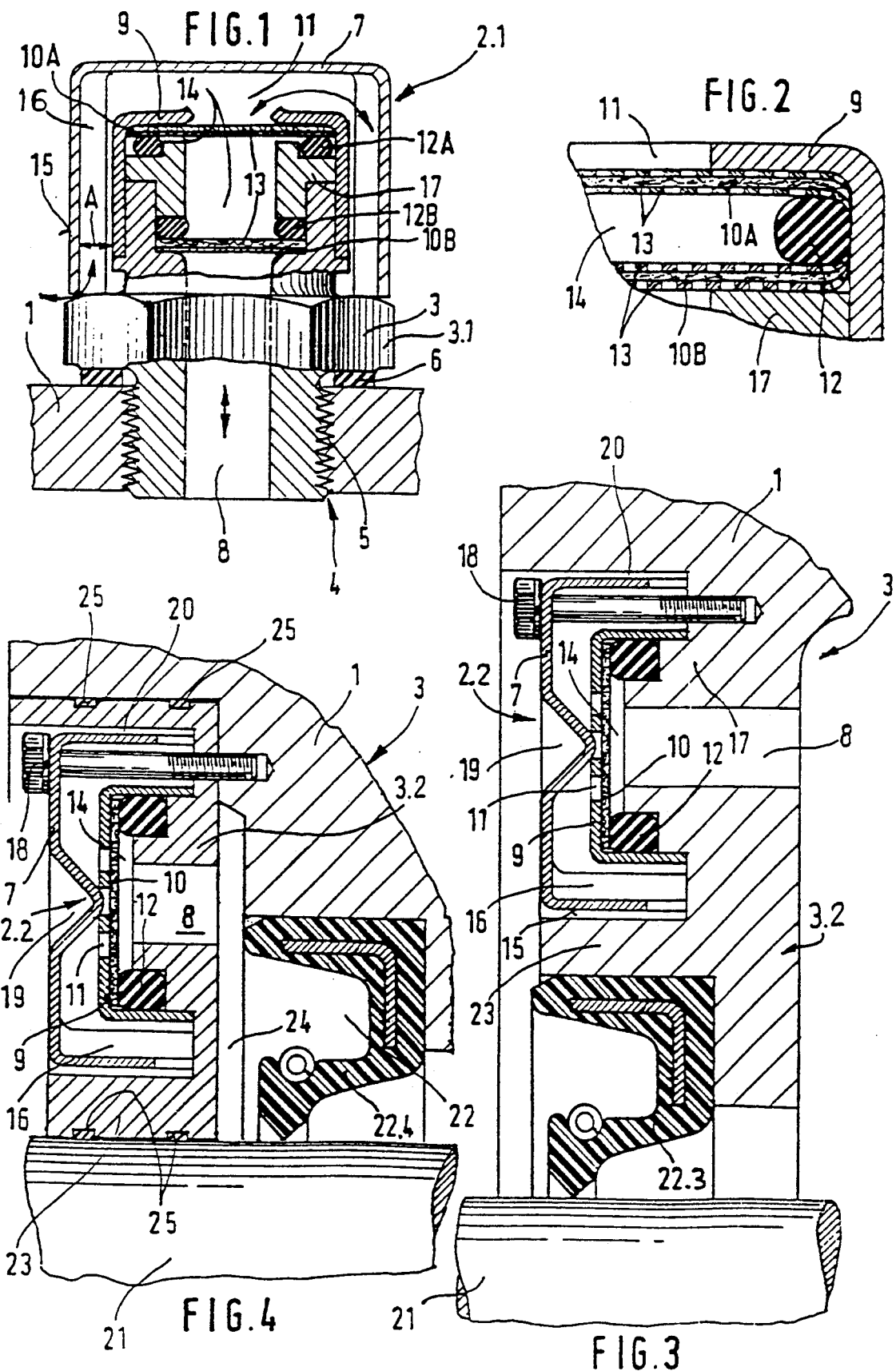

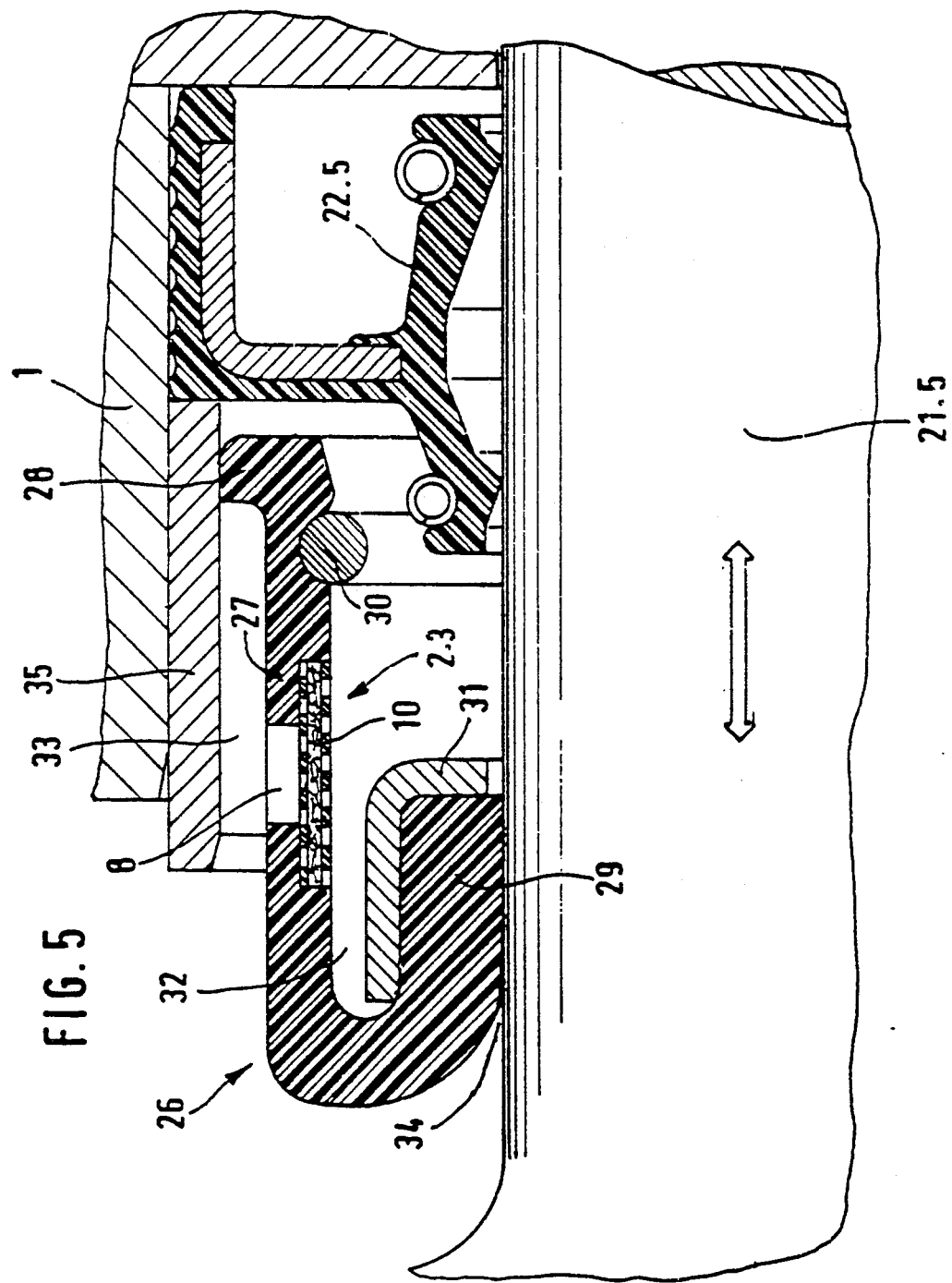

DEVICE FOR EQUALIZING PRESSURE BETWEEN MACHINE HOUSING AND THE SURROUNDINGS

The invention concerns a pressure compensator and the point of departure is the vents with filter inserts for polluted environments that prevent oil ejection from the housing in the pressure compensation. Pressure compensators with filter inserts such as known from FR 2,414,849 still have the disadvantage that no discharge without lubricant ejection and no absorption without gradual penetration of dirt are possible. Therefore, they require, strictly speaking, very frequent servicing. Such pressure compensators are mostly known as insert bodies screwable in the wall of the machine housings in which a felt or a fabric is secured under a cover plate leaving free a breathing gap.

The oil mist that has been discharged upon heating and then deposits in the environment area not infrequently simulates a leakage. In an oil-soaked, stickily smudgy environment heavy accumulations of dirt promptly result and the ventilation gap can finally become fully clogged. The collapse of the ventilation function associated therewith then leads to a certain overpressure in the machine housing and, consequently, to destruction of the filter or to intolerable, real heavy losses of oil through other openings of the housing. It easily occurs then that shaft seals, etc., act as valves since they have not been designed for over pressurization.

With such conventional pressure compensators, whose parts consist of separator components and filter material, there also is not obtained any reliable water tightness such as needed when using tractors in rice fields or in other machines to be used under water in order to eliminate the inrush of water in the machine housing. Defective or lacking maintenance often results in the breakdown of such pressure compensators that seem to be so simple themselves.

EP-A-01 55 115 also shows that discharges of liquid can be prevented, in the meantime, while maintaining the capacity for breathing with an apparatus for ventilating pipes, fermentation containers, etc., with which, aided by a water-tight diaphragm material known per se, the exit of liquid can be prevented. Here a filter is employed which uses in combination a gas-pervious and water-tight plastic diaphragm and a protective base pervious to gas and water, in order to protect the diaphragm against overpressure on the side of the liquid. Synthetic fleece, foam and fabric, dry powdered metal, ceramic and wire screens have been mentioned as materials for said base directly associated with the diaphragm. It has also been proposed here to join the diaphragm and the base with each other by means of a plastic border.

However, said construction of the ventilation is still not suited for machine housings. The above explained blockage problem subsists, since mud and dust accumulations which hinder the pressure compensator from recirculating clean air, for example, when the machine housing is cleaned still can enter from the outside. The exclusively provided stiff arrangement of the diaphragm and the base in the respirator body is in particular inadequate for keeping the diaphragm free of blockage without maintenance even when the air side of the pressure compensator is heavily loaded with dirt.

The problem to be solved by the invention is to provide pressure compensators for machine housings that are really liquid-tight and no longer discharge oil mist, and which, in rough outer operation and with heavy dirt in the external area, clearly have longer serviceability and normally do not require any more maintenance expense since, on one hand, at low construction cost they are in both directions pervious to air and gas, but as completely as possible are no longer pervious to oil or water and, on the other hand, they also are self-cleaning.

This problem is solved with the pressure compensator essentially by the fact that a material known from water pipe vents, etc., is now used for a conveniently designed preventer of lubricant discharge. The liquid-tight but highly gas-pervious diaphragm is flexibly designed from an extremely thin, microporose synthetic foil joined on one or two sides with a flexible but tough-to-bending base material (such as a fiberglass fleece, a perforated foil, a synthetic fiber, a fabric, etc.) and bendably clamped on all sides by the respirator duct in a manner such as to be both protected against mechanical damages from dirt accumulations and to remain capable of bulging resulting from pressure differences caused by dirt to an extent such that when the pressure differences caused by dirt are changed, it can flap or vibrate, whereby a self-cleaning effect is obtained with shaking off and breaking up, the same as blasting, the diaphragm coatings without the diaphragm itself breaking or losing its liquid-sealing action.

The foil has for this purpose, at least on the lubricant side, a free space of movement in the housing of the pressure compensator into which it can flatten or bulge relatively without resistance. The change-oriented distortions associated therewith are desired in order that eventual deposits on the external side of the diaphragm can be prevented from caking.

Other advantages are obtained with the embodiments indicated in the sub-claims. The free space is especially effective since two diaphragms spaced from each other and flexibly supported are provided, the inner one keeping the oil at a distance from the interspace. The outer diaphragm prevents the entrance of water and protects the interspace from dust, etc.

Depending on the direction of the pressure, the diaphragms elastically clamped on their periphery against an elastomer ring can curve outwardly or inwardly and at the same time, if needed, can be repeatedly, automatically and periodically rid of deposits, since they also eject or break up incrustations.

By the spaced apart clamping of diaphragms which respectively have at least one supporting base, an additional extension of service life can be obtained.

With the inherent physical values of the diaphragm, it is possible to obtain specially favorable functional properties in the pressure compensators according to the invention.

When using a synthetic material such as PTFE, adequate for high and low temperatures, a very long life with good ventilating efficiency is obtained even under extreme conditions. The foils of the diaphragms are preferably made of a thickness of about 0.01 to 0.10 mm, a pore size of about 0.2 to 2.0 mm and a porosity of about 80 to 100% and then remain oil-tight to an admission pressure of about 2 bar. The preferred synthetic material PTFE possesses a very high chemical resistance between $-240°$ C. to $+270°$ C.

By using an insert body that is pre-assembled and protects the diaphragms, machine housings of different kinds can be equipped with pressure compensators of the same structural shape and possibilities of installation.

When a dirt repellent is directly integrated in the insert body, then the portion of dirt to be kept away can be favorably controlled to be as low as possible.

When arranging a dirt repellent in the housing cover, an integration in the housing contour protected against damage is facilitate.

When a respirator opening is placed within a bell-shaped cover, preferably approximately in the upper fifth thereof, the diaphragm comes to be in the area of lower speeds of air flow and at the same time, by virtue of the cover, is also well protected against eventual mechanical damages and direct blockages due to deposits or ice formations, since these can occur outside the cover.

Using a snap cover that cushions the textile diaphragm pressing it upon an elastic seal ring as a hold-down device, a flexible enough self-resealing is obtained, together with a simple assembly secured from damage, even in the case of changes in direction of flow or other reasons for change of direction of the sealing power.

By reinforcing seams made in partial areas of the underside of the cover, there is obtained, together with a series of slot-like cross-sectional passages on the periphery, not only a good insensitivity to shock but also an assurance against inadmissible or defective opening and reinsertion of the diaphragms.

Inserts in the form of threaded, nipples, similar to already known designs, can be provided with a circular diaphragm in order, for example, to be inserted in threaded holes of machine housings.

By designing the insert as an annular cassette and using a circular diaphragm radially situated, it is possible to coordinate a shaft seal with the pressure compensator axially or radially. The over-all length would be saved by the radial coordination and the cassette would be inserted with the shaft seal only in an enlarged bearing hole. An axial coordination makes possible a smaller diameter.

Due to the good elasticity of the textile diaphragm, and making a double use of the mounting space, the former can be directly fitted such as by gluing in a sealing element made of elastomeric material so that with such use absolutely no separate pressure compensator element is any longer needed.

An especially favorable placing of the textile diaphragm results when inserting it in a cover-like sealing part parallel with the shaft which it outwardly surrounds with spacing and in which the textile diaphragm is glued in corresponding windows in the centrifugal force direction, an axial covering of the windows by a housing collar or a sleeve effecting an advantageous dirt repellence.

The invention now discloses the physical advantages of the special diaphragm material also for a special application in the ventilation and degasification of oil-bearing machine housings, which are exposed to considerable soiling from inside and outside and to a continued change of environmental conditions. Formerly there had been disclosed technical applications of the proposed diaphragm materials only for covering large areas of sensitive electronic elements and in biotechnique with one-sidedly pressurized diaphragms and their use as a combination of overpressure and ventilation valve, oil separator and safety against water inrush on machine housings also exposed to outside soiling had not yet been made or proposed and a self-cleaning in rough use had not yet been obtained.

The invention is not confined to the combination of features of the claims. Other logical possible combinations of the claims and the individual features of the claims result for the expert as the problem arises.

The invention is explained in detail herebelow with reference to the diagrammatic drawings of the embodiments.

FIG. 1 shows a pressure compensator having two diaphragms in an insert body shaped as threaded nipple;

FIG. 2 shows an enlarged section of a diaphragm clamped between a clamping cover and an o-ring serving as a spacer with an interspace that remains free of dirt and oil;

FIG. 3 shows the pressure compensator in the form of an insert body designed as annular cassette and radially outwardly surrounded by a shaft seal;

FIG. 4 shows a pressure compensator likewise designed as annular cassette and having a shaft seal axially mounted in front;

FIG. 5 shows a pressure compensator directly designed as sealing element having windows closed by the diaphragm embedded in the sealing elastomer.

In FIG. 1, a pressure compensator 2.1 is inserted in a machine housing by means of an insert body 3.1 completely designed as a nipple in a housing opening 4 where it is secured by threads 5 while pressing together the housing seal 6. The insert body 3.1 is outwardly covered by a bell-shaped dirt repellent covering 7 in a manner such that through a spacing A, a free air gap remains substantially corresponding to the free cross section of a respirator duct 8 that traverses the insert body 3.1. The respirator duct 8 is closed with respect to said air gap under the cover 7 by means of a hold-down device 9 attached to the insert body 3.1 by two diaphragms 10A, 10B, serving as a dirt trap and preventers of lubricant outflow, which are made of liquid-tight but gas-pervious diaphragm material known per se. The inner diaphragm 10B must indispensably be constructed oil-tight and the outer diaphragm 10A at least water-tight so that the interspace remains free of oil and water and the outer diaphragm 10A provides place for vibration. The hold-down device 9 possesses one or more bores 11 over the respirator duct to allow entrance and exit of air or gas which can pass through the diaphragms 10 in both directions. In their outer peripheries, the diaphragms 10 are pressed under prestress against elastomer supports 12 provided here as o-rings. For protection against too strong vibration of the material of the diaphragms 10, perforated protective foils 13 or fleece-like or grid-like protective material can be provided for protection against mechanical damages, but it must preserve the capacity for vibration. The inner edges of the aperture 11 of the hold-down device 9 and also the supports 12 are provided with rounded edges for protection against mechanical damage. The outer diaphragm 10A is held by an elastomer support 12A with a rounded edge profile that supports it under its outer edge in the interspace 14 at a shockproof distance from the upper end face of a spacer 17 sufficient for the vibrations of the diaphragms 10 by the fact that the elastomer support 12A, designed as o-ring, is selected thicker than a collar of the spacer element 17 that radially supports it toward the center of the respirator duct 8. There results here for the outer diaphragm 10A a surface larger by about the collar of the spacer element 17 than for the inner diaphragm 10B which, aided by the lower end face of the spacer sleeve 17 and the lower elastomer support 12B that underlies it, is pressed to a penetration of the insert body 3 approximately corresponding to its thickness. Due to the difference in surfaces and different porosities or elasticities, it is possible, when air, etc., are blown out by means of the different pressure-relaxing degrees, then acting, to release a vibration of the diaphragms 10A and 10B which contributes to keeping the surfaces free.

In FIG. 2 is shown a variant of the above mentioned tightening of the diaphragms 10A, 10B by means of a hold-down device 9 on the elastomer support 12, wherein by a certain radial projection of the o-ring used as elastomer support over the end face of the insert body, a free space results where the diaphragms 10 and an eventual supporting foil or grid 13 inserted in combination therewith can carry out oscillation movements without the result of damaging shearing forces on the sharp edges. If a second diaphragm which retains the oil with certainty is added on the oil side, then the outer diaphragm 10A is protected with certainty against an inner coating by the oil.

In the other figures, only one diaphragm 10 with a base 13 is indicated in each. But double diaphragms, in an arrangement conveniently similar to FIGS. 1+2, are also inserted here, preferably spaced apart.

In FIG. 3 is shown an embodiment of the pressure compensator 2.3 according to the invention with an annular design. The outer edge 15 of the cover 7, similarly to the basic principle according to FIG. 1, can be bent concentrically to the respirator duct 8 over the elastomer support 12 to an extent substantially equal to the edge of the hold-down device 9. For reinforcing the edge 15 and for defining certain apertures for air inflow and outflow, elongated seams 16 can be made in the edge 15 which also ensure the radial spacing of the cover 7 from the hold-down device 9. Instead of an insert body separately introduced in the machine housing 1, a corresponding neck 17 is directly inserted here in a machine housing 1 with corresponding coordination with respect to the respirator ducts 8. For additional security against loosening, the cover 7 can be pressed upon the hold-down device 9 by means of screws 18 when a corresponding burler 19 or spacer is provided in the cover, for example, coaxially above the hold-down device 9. Such an annular pressure compensator 2.3 can be easily and damage-free installed in an annular groove 20 which, for example, outwardly surrounds a shaft 21 with a shaft seal ring 22.3 that encloses it with a small axial partition 23, whereby a radial coordination with a corresponding saving of construction space results in the axial direction.

In FIG. 4 is shown a fundamentally equal design of the pressure compensator 2.2 when it is placed in front of a shaft seal 22.4 outwardly separated by an axial space 24. Similarly to FIG. 3, an annular insert body 3.4 has been also used which is nevertheless sealed with respect to the shaft 21 and the machine housing 1 by means of annular seals 25.

In FIG. 5, the insertion of a pressure compensator 2.3 according to the invention, directly in an additional seal element 26 placed outwardly axially in front of a shaft seal 22.5 is shown. Said seal element 26 which itself can be constructed in any desired manner, has the task of performing, together with the shaft 21.5, certain axial movements that vary the space in front of the shaft seal 22.5 proper, that is, it alone must be aerated or deaerated by itself. For said purpose, in a substantially concentric central portion 27 of the seal element 26, a respirator duct 8 is cut in each one of several places which is interiorly covered by one or several annular small diaphragms(s) 10 which could be glued or vulcanized therein. By virtue of the ventilation, the seal element 26 abuts by its outer collar 28 and its inner collar 29 against the shaft 21.5 or the machine housing 1 always equally strongly radially and even when deformations in the middle of the concentric central portion 27 sometimes appear as result of the axial movements, a durable fastening of the diaphragms 10 is obtained. In the seal element 27 shown as an example, the sealing compression is outwardly ensured by a spreading spring 30 and inwardly by a support ring 31 while maintaining a sufficiently large inner annular groove 32 under an outer radial gap 33 in a manner such that the diaphragms 10 cannot be blocked regardless of any kind of distortion of the seal element 26. In the example, the respirator duct 8 is also axially covered, with spacing, by a special wear-resistant bushing 35 so that dust and dirt cannot directly reach the respirator duct 8.

These possible arrangements permit a long-lasting usefulness of the respirator elements of the pressure compensators which can be produced at reasonable cost, variations in corresponding differently supported conditions of installation being regarded as within the scope of the idea of the invention. By virtue of the valvular properties of the textile material used for the diaphragms 10, steps for protecting the transmission and the machine are possible with long-lasting effectiveness and at low cost in material, assembly and maintenance. No oil fumes can any longer deposit in the area of the respirator duct. Water cannot enter via the vents in the machine housing. Aeration and deaeration are no longer hindered by dirt blockages of the respirator du... and overpressures which can endanger the shaft seals are eliminated.

| Reference numerals | |
|---|---|
| 1 | machine housing |
| 2 | pressure compensator |
| 2.1 | pressure compensator with 3.1 |
| 2.2 | pressure compensator with 3.2 |
| 2.3 | pressure compensator with 3.3 |
| 3 | insert body |
| 3.1 | insert body as nipple |
| 3.2 | insert body as cassette |
| 3.3 | insert body as seal element |
| 4 | housing aperture |
| 5 | thread in 4 |
| 6 | housing seal |
| 7 | cover (dirt repellent) |
| 8 | respirator duct (bore) |
| 9 | hold-down device |
| 9A | spacer sleeve |
| 10A, 10B | (lubricant outflow preventer) |
| 11 | aperture in 9 |
| 12A, 12B | o-rings (elastomer base for 10) |
| 13A, 13B | supporting foils or grid |
| 14 | interspace or vibration-free space for 10 in only one diaphragm |
| 15 | edge of 7 |
| 16 | seam in 7 |
| 17 | spacer element or sleeve |
| 18 | screws for 7 |
| 19 | burlers in 7 |
| 20 | annular groove in 1 |
| 21 | shaft |
| 22 | bearing hold |

-continued

| Reference numerals | |
|---|---|
| 22.4 | shaft seal ring |
| 23 | partition of 1 |
| 24 | axial space of 3.4 and 22.4 |
| 25 | seals of 3.4 in 1 |
| 26 | seal element with 7 and 8 |
| 27 | concentric middle portion of 26 |
| 28 | outer collar of 26 |
| 29 | inner collar of 26 |
| 30 | spreading spring for 26 |
| 31 | supporting ring for 26 |
| 32 | inner annular groove of 26 |
| 33 | outer radial gap on 26 |
| 34 | inner radial gap on 26 |
| 35 | bushing in 1 |
| A | spacing of 3.1 and 7 for 8 |

I claim:

1. A pressure compensator (2) for covering an opening (4) extending through a machine housing (1), said pressure compensator (2) comprising a liquid-impervious gas-pervious element in the form of a pliant plastic first diaphragm (10, 10A) with a supporting grid (13) of a relatively less pliant material provided on one surface thereof,
wherein, in use, said first diaphragm (10A) and said supporting grid (13) obstruct communication through the opening (4), the peripheral edges of said first diaphragm (10A) and said supporting grid (13) being tightly compressed together between an exterior hold-down device (9), having at least one aperture (11) therein allowing communication between the opening (4) and the environment, and said machine housing (1) with an elastomeric element (12) positioned between said first diaphragm (10, 10A) and said machine housing (1), and said first diaphragm (10A) being supported so that it can deform from a neutral position at least in a direction toward said opening (4).

2. A pressure compensator according to claim 1, further comprising a liquid-impervious gas-pervious pliant plastic second diaphragm (10A) having a supporting grid (13) of a relatively less pliant material on one surface thereof, and
said first and second diaphragms (10A, 10B) are both clamped between said hold-down device (9) and said housing (1) with at least one said elastomeric element (12) located between said first and second diaphragms (10A, 10B) to form an interspace (14) therebetween which is held free of lubricant by said second diaphragm (10B) and free of dust and water by said first diaphragm (10A).

3. A pressure compensator according to claim 2, wherein the interspace between said first and second diaphragms (10A, 10B) is further formed by a spacer sleeve (17) having opposed ends with an opening extending from one opposed end to the other opposed end of the sleeve (17), and a said elastomer element (12) is provide adjacent each opposed end of the sleeve (17) for engaging and tightly compressing the peripheral areas of said first and second diaphragms (10A and 10B) and their associated supporting grids (13) together.

4. A pressure compensator according to claim 3, wherein inner edges of said at least one aperture (11) of said hold-down device (9) is rounded; and said elastomeric supports (12) and said spacer element (17) have rounded inner edges.

5. A pressure compensator according to claim 2, wherein said supporting grid (13) of said first diaphragm (10B) and of said second diaphragm (10A) is a perforated foil and a fleece material, respectively, provided on the side of said diaphragms remote from said machine housing (1).

6. A pressure compensator according to claim 1, wherein an insert body (3.1 or 3.2 or 3.3) is used to attach said pressure compensator to said machine housing (1) and said insert body is completely replaceable with said first diaphragm (10, 10A).

7. A pressure compensator according to claim 1, wherein an outer dirt repellent cover (7) is provided for enclosing said pressure compensator.

8. A pressure compensator according to claim 7, wherein said dirt repellent cover (7) is fastened to said machine housing (1).

9. A pressure compensator according to claim 1, wherein a dirt repellent bell-shaped cover (7) has a free space (A), formed between a nipple defining a respirator duct 8 and said bell-shaped cover (7), corresponding to a cross section of said respirator duct (8).

10. A pressure compensator according to claim 3, wherein an elongate nipple, having a respirator duct extending therethrough, is provided with means, adjacent one end thereof, for engaging the opening of the housing and a second end of said nipple is configured to support said pressure compensator and connect it to said machine housing (1).

11. A pressure compensator according to claim 8, wherein dirt repellent cover (7) is provided with a central burler (19) for separating a central portion of said dirt repellent cover (7) from the hold-down device (9).

12. A pressure compensator according to claim 1, wherein said first diaphragm (10) has a supporting grid provided on both sides thereof.

13. A pressure compensator according to claim 12, wherein said second diaphragm (10A) has a larger exposed surface area than an exposed surface area of said first diaphragm (10B).

14. A pressure compensator (2) for covering an opening (4) extending through a machine housing (1), said pressure compensator (2) comprising a liquid-impervious gas-pervious element in the form of a pliant plastic first diaphragm (10, 10A) with a supporting grid (13) of a relatively less pliant material provided on one surface thereof and a second liquid-impervious gas-pervious pliant plastic diaphragm (10A) having a supporting grid (13) of a relative less pliant material on one surface thereof, said first and second diaphragms (10A, 10B) are both clamped between a hold-down device (9), having at least one aperture (11) therein allowing communication between the opening (4) and the environment, and said machine housing (1), at least one elastomeric element (12) is located between said first and second diaphragms (10A, 10B) to form an interspace (14) therebetween which is held free of lubricant by said second diaphragm (10B) and free of dust and water by said first diaphragm (10A), wherein, in use, said first and second diaphragms (10A, 10B) obstruct communication though the opening (4) and both said first and second diaphragms (10A, 10B) are supported so that said diaphragms can deform in at least one direction from a neutral position.

* * * * *